US012284486B2

(12) United States Patent
Fabry et al.

(10) Patent No.: US 12,284,486 B2
(45) Date of Patent: Apr. 22, 2025

(54) METHOD, DEVICE, HEADPHONES AND COMPUTER PROGRAM FOR ACTIVELY SUPPRESSING THE OCCLUSION EFFECT DURING THE PLAYBACK OF AUDIO SIGNALS

(71) Applicant: RHEINISCH-WESTFALISCHE TECHNISCHE HOCHSCHULE (RWTH) AACHEN, Aachen (DE)

(72) Inventors: Johannes Fabry, Aachen (DE); Stefan Liebich, Aachen (DE); Peter Jax, Aachen (DE)

(73) Assignee: RHEINISCH-WESTFALISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 309 days.

(21) Appl. No.: 17/927,183

(22) PCT Filed: May 27, 2021

(86) PCT No.: PCT/EP2021/064168
§ 371 (c)(1),
(2) Date: Nov. 22, 2022

(87) PCT Pub. No.: WO2021/239864
PCT Pub. Date: Dec. 2, 2021

(65) Prior Publication Data

US 2023/0328462 A1 Oct. 12, 2023

(30) Foreign Application Priority Data

May 29, 2020 (DE) ..................... 10 2020 114 429.6

(51) Int. Cl.
*H04R 25/00* (2006.01)
*G10K 11/178* (2006.01)

(52) U.S. Cl.
CPC ..... *H04R 25/505* (2013.01); *G10K 11/17827* (2018.01); *G10K 11/17854* (2018.01); *G10K 2210/1081* (2013.01); *H04R 2460/05* (2013.01)

(58) Field of Classification Search
CPC .............. H04R 25/505; H04R 2460/05; G10K 2210/1081; G10K 11/17854
See application file for complete search history.

(56) References Cited

U.S. PATENT DOCUMENTS 10,034,091 B2 7/2018 Nawful et al.
10,595,151 B1 3/2020 Chen et al.
(Continued)

FOREIGN PATENT DOCUMENTS

EP 2362678 A1 8/2011
EP 3188495 A1 7/2015
(Continued)

OTHER PUBLICATIONS

International Search Report and Written Opinion for PCT/EP2021/064168 dated Sep. 2, 2021.

*Primary Examiner* — Sunita Joshi
(74) *Attorney, Agent, or Firm* — MOSER TABOADA

(57) ABSTRACT

In the method according to the invention for actively suppressing the occlusion effect during the playback of audio signals by means of headphones or a hearing aid, a sound signal occurring from outside is captured by means of at least one outer microphone of the headphones or the hearing aid. A voice signal is captured by means of at least one additional microphone. The dry component of the captured voice signal is estimated, the dry component of the captured voice signal being the component of the captured voice signal without reverberation caused by the surrounding space. By means of a filter, a voice component is extracted from the outer sound captured using the at least one outer
(Continued)

microphone. The extracted or produced voice component is output by means of a loudspeaker of the headphones or the hearing aid.

9 Claims, 5 Drawing Sheets

(56) References Cited

U.S. PATENT DOCUMENTS

| | | | | |
|---|---|---|---|---|
| 2014/0126735 | A1 | 5/2014 | Gauger, Jr. | |
| 2019/0043518 | A1* | 2/2019 | Li | G10L 21/02 |

FOREIGN PATENT DOCUMENTS

| | | | | | |
|---|---|---|---|---|---|
| EP | 2920980 | A1 | | 9/2015 | |
| EP | 2920980 | B1 | * | 10/2016 | H04R 1/08 |
| EP | 3213527 | A1 | | 9/2017 | |
| WO | WO-2011101045 | A1 | * | 8/2011 | H04R 25/407 |

* cited by examiner

METHOD, DEVICE, HEADPHONES AND COMPUTER PROGRAM FOR ACTIVELY SUPPRESSING THE OCCLUSION EFFECT DURING THE PLAYBACK OF AUDIO SIGNALS

Illustrative embodiments relate to a method for actively suppressing the occlusion effect during the playback of audio signals with headphones or a hearing aid. Illustrative embodiments also relates to a device for carrying out the method. Furthermore, illustrative embodiments also relate to headphones which are arranged to carry out the disclosed or have a disclosed device, and to a computer program with instructions that cause a computer to carry out the steps of the method.

The muffled and unnatural perception of one's own voice when wearing headphones, hearing aids or headsets is perceived as annoying by the wearers of such devices. This effect, known as the occlusion effect, occurs when the ear canal of the wearer of such headphones or hearing aids is partially or completely closed by the device. The occlusion effect is therefore also particularly pronounced in so-called in-ear devices, in which the headphones or hearing aid are inserted into the opening of the ear canal and rest against its inner wall. The muffled perception of one's own voice is based on the one hand on the fact that the high-frequency components of one's own voice transmitted by the airborne sound are significantly attenuated due to the headphones or hearing aids closing the ear canal. On the other hand, it is mainly the low-frequency parts of one's own voice that are transmitted into the ear canal by structure-borne sound, in particular via sound transmission from the cartilage or bones of the head, and cannot or only partially escape the ear canal due to the closure, so that the low-frequency parts are even amplified.

Methods for compensating the occlusion effect by correcting the airborne and structure-borne sound components in quiet environments are known. These include an attenuation of structure-borne sound via a feedback control loop based on a microphone signal that reflects sound signals from the ear canal and is recorded with an inner microphone. The airborne sound components are recorded by an outer microphone, filtered and reproduced via an internal loudspeaker in order to create an acoustically transparent perception of the sound signals arriving from the outside.

However, in addition to the user's own voice, the airborne sound component also includes ambient noise from the environment Since current technical solutions have so far failed in environments with a high noise level, measures that enable the most natural possible perception of one's own voice even under such conditions are the subject of current research.

Furthermore, various in-ear headphones and headsets already have a "sidetone" or "hear-through" function. With the "sidetone" method, it is possible to hear one's own voice, for example during a telephone call, which is made with such headphones or headsets. For this purpose, a voice signal is recorded with a microphone, which enables clear voice reproduction, but spatial and binaural information is lost in the process. The "hear-through" method makes it possible to perceive the environment and, for example, to be able to have a conversation without having to remove the headphones. One or more outer microphones are used for this on each side of the headphone, which means that spatial information of one's own voice is retained, but in this case the signal contains unwanted ambient noise.

A headset that initially operates in a "noise-canceling" mode and then switches to a "hear-through" mode as soon as a voice activity detection determines that the user is on a call is described in EP 3 188 495 A1. Similarly, EP 2 362 678 A1 describes a communication headset with a switching function between a transparent mode and a communication mode.

Furthermore, U.S. Pat. No. 10,034,092 B1 describes digital audio signal processing techniques that are used to provide an acoustic transparency function in a headphone. Here, a plurality of acoustic paths for different users or artificial heads are taken into account in order to determine a transparency filter that provides good results for most users.

The disclosed embodiments provide a method and a device for actively suppressing the occlusion effect when reproducing audio signals with headphones or hearing aids in environments with a high noise level, as well as a corresponding headphone and a computer program for carrying out the method.

In the disclosed method for actively suppressing the occlusion effect during the playback of audio signals with headphones or hearing aids, at least one outer microphone of the headphones or hearing aids captures external sound in the form of a sound signal occurring from the outside. A voice signal is captured with at least one additional microphone. The dry component of the captured voice signal is estimated, wherein the dry component of the captured voice signal is the component of the captured voice signal without reverberation caused by the surrounding space and without ambient noises. A voice component is extracted from the external sound captured with the at least one outer microphone by a filter, with filter coefficients of the filter being determined based on the estimated dry component of the captured voice signal, or the estimated dry component of the captured voice signal is filtered in such a way that a voice component is produced, which has a comparable spatiality to the voice component at the external microphones. The extracted or generated component of the voice is output through a loudspeaker of the headphones or hearing aid.

In this way, a more natural and undisturbed perception of one's own voice results. This leads to a significant gain in comfort, which not only leads to increased acceptance of such headphones or hearing aids, but also opens up the possibility of new user experiences when using these products.

According to one embodiment, the voice signal is captured with at least one microphone or microphone array directed towards the user's mouth and/or an inner microphone of the headphones or hearing aid. Both such a mouth microphone and the inner microphones offer a very good signal-to-noise ratio, either due to their directional characteristics, their spatial proximity or the shielding.

In particular, a monaural dry component is estimated from the detected voice signal, based on which binaural voice signals are extracted from the signals of at least two outer microphones of left and right headphones or left and right hearing aids. Alternatively, the estimated monaural dry voice component can be filtered in such a way that binaural voice signals with a comparable spatiality to the voice component at the outer microphones are generated.

This combines the advantages of the "sidetone" and "hear through" methods, so that spatial and binaural information is retained when the sound signals are reproduced and unwanted ambient noise is suppressed at the same time.

According to one embodiment, the binaural voice signals are filtered before being output via a loudspeaker for left and right headphones or a left and right hearing aid.

Advantageously, the dry voice component is estimated at the outer microphone by filtering with the respective relative impulse response between the mouth microphone or microphone array and the outer microphone and subsequent averaging.

Furthermore, the filter for extracting or generating the voice component based on the detected external sound and the estimated dry voice is preferably a Wiener filter, an adaptive filter or a filter which simulates a room impulse response.

According to another embodiment the estimated dry component of the captured voice signal and the extracted or generated voice component are linearly weighted and then added.

Accordingly, a disclosed device for the active suppression of the occlusion effect during the playback of audio signals by means of a loudspeaker of a headphone or hearing aid provided with at least one outer microphone comprises

- at least one additional microphone for capturing a voice signal of a user;
- a digital signal processor arranged to
  - estimate a dry component of a voice signal captured with the at least one additional microphone, wherein the dry component of the captured voice signal is the component of the captured voice signal without reverberation caused by the surrounding space and without ambient noises;
  - extract from the external sound captured with the at least one outer microphone the voice component using a filter, wherein filter coefficients of the filter are determined based on the estimated dry component of the captured voice signal, or filters the estimated dry component of the captured voice signal to produce a voice component which has comparable spatiality to the voice component at the outer microphones; and
  - output the extracted or generated component of the voice via the loudspeaker.

According to one embodiment, a digital filter is additionally provided, to which the extracted or generated voice component is fed before it is output via the loudspeaker.

Embodiment also relate to headphones being adapted to carry out the disclosed method or comprising a disclosed device, and a computer program with instructions which cause a computer to perform the steps of the disclosed method.

Further features of the embodiments will become apparent from the following description and claims in conjunction with the figures.

FIG. 1 schematically shows an in-ear headphone with occlusion of a user's ear canal;

For a better understanding of the principles of the present invention, embodiments of the invention are explained in more detail below with reference to the figures. It is understood that the invention is not limited to these embodiments and that the features described can also be combined or modified without departing from the scope of protection of the invention as defined in the claims.

Figure 1:
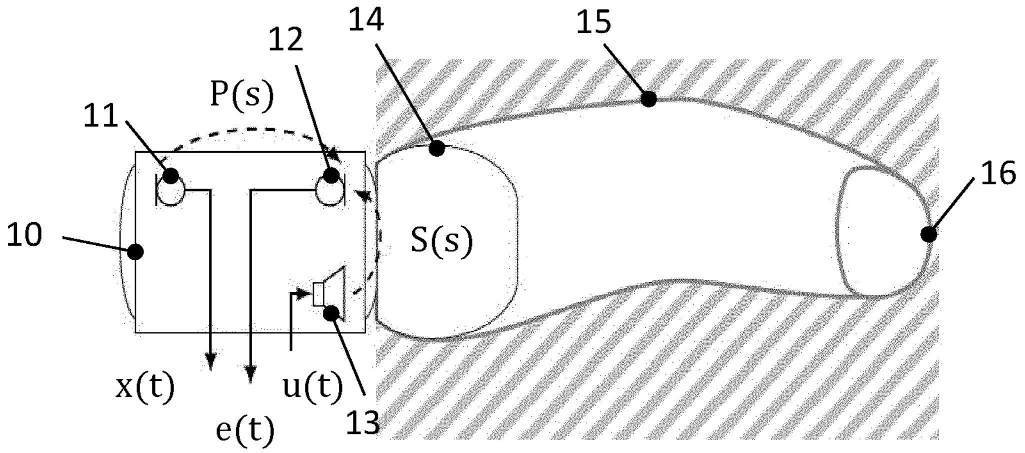

The disclosed method can be used, for example, to reduce the occlusion effect of in-ear headphones, as shown schematically in FIG. 1. The in-ear headphones 10 are in this case located on the ear of a user, with an ear insert 14 of the in-ear headphones being inserted in the external ear canal 15 in order to hold them in place. Depending on the individual fit in the ear canal and the material, the ear insert seals the ear canal to a certain degree. This results in external noise being at least partially shielded, so that this noise then only reaches the user's eardrum 16 at a reduced level. Thus, on the one hand, music playback via the headphones or the playback of a caller's voice during a telephone call using the headphones is less disturbed. On the other hand, the ear insert also dampens the user's voice and thus leads to the occlusion effect mentioned above.

A noise signal x(t) arriving at the headphones from the environment, which can contain the voice of the user in particular, but also environmental noise, is detected with an outer microphone 11, which is directed away from the ear canal in the direction of the headphones surroundings. Furthermore, the in-ear headphones 10 have an inner microphone 12 which is directed towards the ear canal 15 in the direction of the ear canal or eardrum of the user and a loudspeaker 13 located near the inner microphone 12. A compensation signal u(t) can be output by means of the loudspeaker 13, with which the occlusion effect is suppressed as comprehensively as possible, or at least reduced, so that the user is ideally given the impression that he would not be wearing headphones.

With the help of the outer microphone 11, the airborne components of the noise signal are detected, and a compensation signal is generated for them. In addition, the inner microphone detects a residual signal e(t) after a superimposition of the compensation signal u(t) filtered through the secondary path S(s) with the noise signal x(t) filtered through the primary path P(s) and enables, in particular, also to detect a structure-borne noise component and to take it into account in the compensation signal. The primary acoustic path P(s) describes the transfer function for the acoustic transmission from the outer microphone to the inner microphone 12, and can be measured with an external loudspeaker structure, for example. The secondary acoustic path S(s) describes the transfer function from the internal loudspeaker 13 to the inner microphone 12 and can be measured using this loudspeaker and inner microphone.

The in-ear headphones shown have only one outer microphone, but multiple microphones arranged in a microphone array can also be used. Furthermore, the occlusion effect can also occur with other headphones, such as headband headphones with circumaural ear pads that close the ear canal due to their closed design, or hearing aids and can be compensated for as described below.

Figure 2:
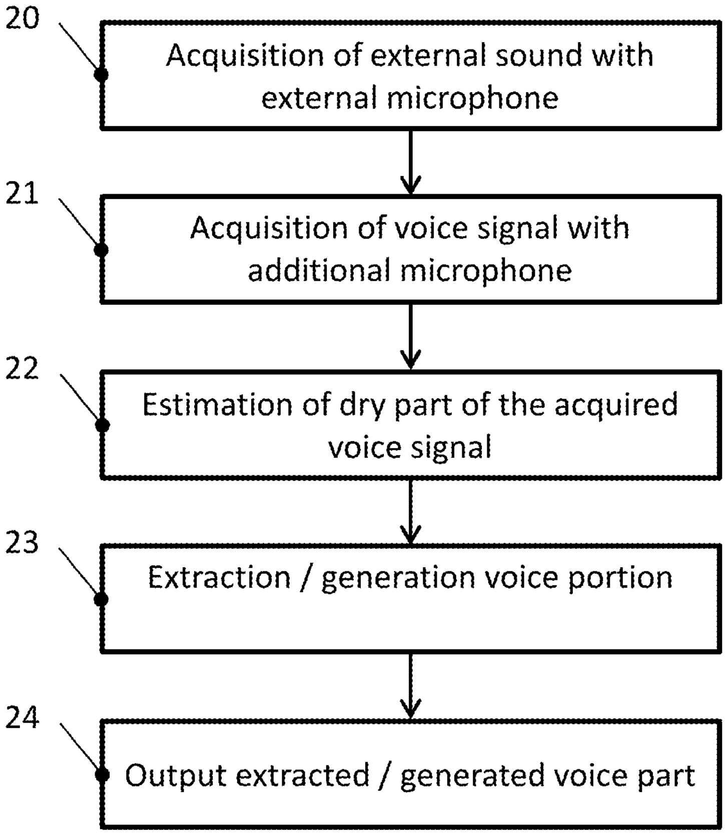
FIG. 2 shows a flow chart of the disclosed method for actively suppressing the occlusion effect.

FIG. 2 schematically shows the basic concept for a method for actively suppressing the occlusion effect, as can be carried out, for example, when reproducing audio signals with an in-ear headphone from FIG. 1. Here, in a first step 20, the external sound is detected with at least one outer microphone 11 of the headphones or hearing aid. This detected external noise also includes an acoustic voice component, which originates from a voice output by the user who is wearing the headphones. In a subsequent step 21, a voice signal that corresponds to the user's voice output is detected with at least one additional microphone, for example a microphone of a communication headset directed at the user's mouth, hereinafter also referred to in short as mouth microphone.

Then, in step 22, the dry component of the voice signal captured with the additional microphone is estimated. As is well known to those skilled in the art, a dry audio signal is understood to mean a pure sound signal as it originally was when it was generated, i.e., without any reverberation due to reflections of the sound waves generated, in a closed room or in a naturally delimited area and free from ambient, acoustic disturbances. In this step, the voice signal is estimated as it was generated directly by the user's vocal tract.

Based on the estimated dry component of the captured voice signal, in the subsequent step for the microphone signal of the respective outer microphone the contained binaural voice signal is estimated and extracted with a filter, where filter coefficients of the filter are determined based on the estimated dry component of the captured voice signal. Alternatively, the estimated dry voice signal can be filtered in such a way that it has a comparable spatiality to the voice component at the outer microphones. The extracted or generated binaural voice component is then output in step 24 via the corresponding loudspeaker of the headphones or hearing aid, with the signal being adjusted beforehand by means of a forward ("feedforward") filter in such a way that the acoustically transparent reproduction of the voice signals is possible.

Figure 3:
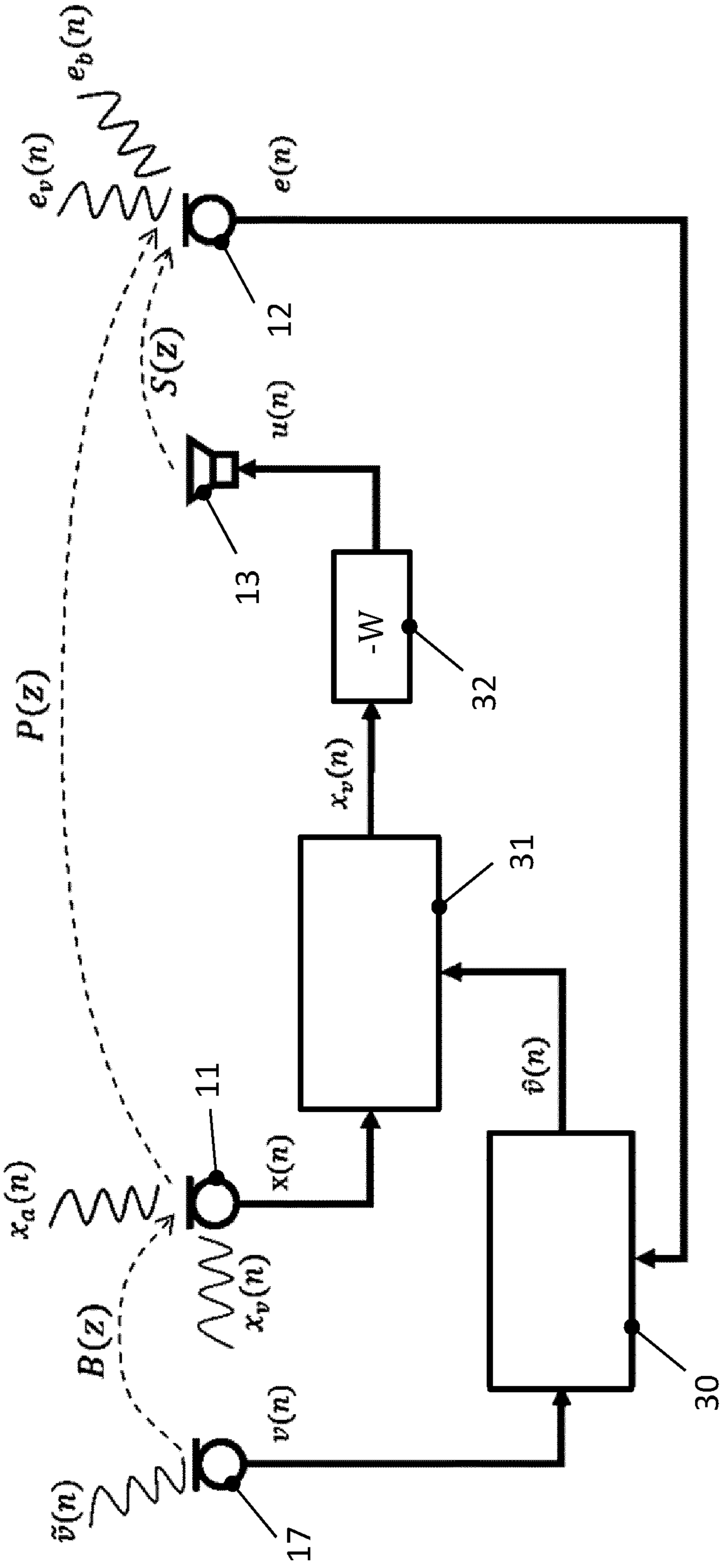
FIG. 3 shows a block diagram of a first embodiment of a disclosed headphone.

FIG. 3 shows a block diagram of a disclosed device, which can be implemented in particular in headphones, but also in a hearing aid. Although transducers are usually provided for both ears of the user in headphones or hearing aids, only the conceptual structure relating to one ear is shown in the figure for the sake of clarity. Likewise, analog-to-digital converters for digitizing the sound signals detected with the microphones and digital-to-analog converters for converting the processed signals for output via the loudspeaker are required for digital signal processing but are not shown in the figure for simplification. Due to the digital signal processing, the signals are considered in the following in the time domain with a discrete time index n, the index z correspondingly stands for a frequency domain representation of the time-discrete signals and filters.

As already mentioned in connection with FIG. 1, an outer microphone 11 and an inner microphone 12 are provided in addition to the loudspeaker 13, which can each be arranged in an earphone or a headphone shell. The outer microphone 11, which supplies the signal x(n), is attached to the outside of the headphones. The loudspeaker 13 and the inner microphone 12, on the other hand, are arranged inside the headphones and are directed in the direction of the eardrum.

Furthermore, a mouth microphone 17 is provided. This can be part of a communication headset, for example, and can be attached to a pivoting bracket in order to be placed in front of the user's mouth and aligned with the mouth. However, a microphone array consisting of several microphones can also be provided, which is arranged on the outside of the headphones or hearing aid and is aligned with the mouth, for example using a beam-forming method. In addition to the primary path P(z), which describes the acoustic transmission from the outer microphone to the inner microphone, and the secondary path S(z) for the transmission from the loudspeaker to the inner microphone, there is also the transmission path B(z) between the mouth microphone and the external reference microphone noted, which is given for example in a communication headset by the predefined position of the swivel microphone in front of the mouth relative to the position of the outer microphone. The transmission paths also include the influence of other components, such as the analog-to-digital converter and digital-to-analog converter (not shown).

If the user of the headphones or hearing aid outputs a voice, then a voice signal $x_v(n)$ corresponding to this voice output is detected by the outer microphone 11. The detected voice signal $x_v(n)$ contains the room impulse response, which contains all relevant information about the current acoustic room properties. In addition to this voice signal, however, an interference signal $x_a(n)$ caused by ambient noise is also detected by the outer microphone 11, since the outer microphone 11 is attached to the outside of the headphones. The audio signal x(n) consisting of these two signal components is then processed as described below based on an estimate of the dry voice signal to provide acoustic transparency for the user's own voice by an output of the processed voice signals u(n) via the loudspeaker 13 of the headphones or hearing aid. The voice signal that hits the headphones from the outside is transmitted both via the primary path P(z) from the outer to the inner microphone and via the secondary path S(z) in the form of the signal that is actively output via the loudspeaker 13. In this way, the missing airborne sound part of one's own voice is added again. Acoustic interference of the sound signals transmitted via these two paths then leads to the acoustic transparency for the voice signal.

In the exemplary embodiment shown, both the voice signal v(n) measured by the mouth microphone 17 and the error signal e(n) from the inner microphone are fed to an estimation unit 30, in which the pure, dry voice signal $\hat{v}(n)$, as produced in the vocal tract and without reverberation caused by the surrounding space and free from ambient acoustic interference; is estimated. Based on this monaural estimate $\hat{v}(n)$ a second estimation unit 31 extracts the binaural voice signal from the signal captured with the outer microphone of the left and right headphones. Alternatively, the estimated dry voice signal can also be filtered in such a way that it has a comparable spatiality to the voice component at the outer microphones. The binaural voice signals $x_v(n)$ are then filtered by a digital filter unit 32 with a negated transfer function and finally fed as a loudspeaker signal u(n) to a sound transducer for output via the headphones. The digital filter unit 32 is designed here in particular as a forward filter ("feedforward filter").

For dry voice signal estimation $\hat{v}(n)$ in the estimation unit 30, the voice signal v(n) can be measured by a mouth microphone 17 and then used as a speech reference. The estimation of the dry voice component at the outer microphone can be done, for example, by filtering the additional signals with the respective relative impulse response between the additional microphone and the outer microphone and then averaging them. For this purpose, the mouth microphone signal v(n) can be filtered, for example, by an estimation $\beta(n)$ of the relative transmission path B(z) between the mouth microphone and the outer microphones. The voice signal v(n) is considered here as a monaural source, which is then used for both headphones or ears.

An error signal e(n) can also be detected by the inner microphone 12, which can also be used for the estimation of the dry voice signal $\hat{v}(n)$ and can be fed to the estimation unit 30 for this purpose. Since the ear is closed by the headphones, one's own voice couples strongly into the ear canal via the body, so that information about one's own voice can also be obtained by means of the microphone signals from the inner microphone. The error signal e(n) comprises an error component $e_v(n)$ based on the voice signal and a further error component $e_b(n)$ which is based on further disturbances such as impact sound transmitted via the user's body into the ear canal. In this case, separate error signals are generated for each of the two headphones or ears. These can differ, for example, if the fit of the headphones differs.

However, the separate error signals can also be averaged, if necessary, in order to obtain a monaural signal again.

The signals from the mouth microphone and the inner microphones can be adjusted, for example, by digital filtering and then combined by averaging to further improve the signal-to-noise ratio. It should be noted that the signals played back via the headphone loudspeakers are each convolved with an estimate of the respective secondary path and subtracted from the respective inner microphone signal in order to prevent signal feedback.

Since the inner microphones mainly record the structure-borne noise component of one's own voice, which does not allow for a breakdown of fricatives, for example, an extension of the bandwidth of the signals from the inner microphones is also conceivable.

Since both the mouth microphone and the inner microphones offer a good signal-to-noise ratio, it can also be envisaged that instead of an estimation based on a combination of signals from the two microphones, an estimation based only on the signal measured with the mouth microphone or the signal of the inner microphone can be performed. Finally, in particularly favorable conditions, these can already provide a dry reference of the voice without the need for an additional estimate.

In the second estimation unit 31, the binaural voice signal is estimated by extracting the binaural voice from the signals of the outer microphone signals, disturbed by ambient noise, based on the estimate of the dry voice, or by generating a voice signal which has a comparable spatiality to the voice component at the external microphones. It is important that the processing has a short and constant delay so that the delay can be taken into account for the calculation of the forward filter W(z).

For this purpose, for example, a Wiener filter or other algorithms for noise suppression can be used. In the Wiener filter, the magnitude spectra of the detected signals are evaluated in order to calculate a filter with an estimate of the speech signal and an estimate of the existing interference signal, with which the speech signal can be optimally extracted. For example, the magnitude spectrum of the mouth microphone can be combined with the magnitude spectrum of the inner microphones to estimate the magnitude spectrum of the dry vocal signal and then extract the speech component from the outer microphone signals. Here, the transfer function B(z) can be used to estimate how the dry voice arrives from the mouth microphone at the outer microphone, in order to then compensate for the propagation times of the direct sound.

Since the transfer function B(z) in a communication headset is very similar for different persons, the impulse response can be determined, for example, by a series of measurements for a specific headset and then used for applications with headsets of this design.

One possibility is Wiener filtering in a "filter bank equalizer" structure. This structure assumes a prototype low-pass filter that has a constant group delay. The spectral weights of the Wiener filter require an estimate of the useful and the interference signal. The estimate of the dry voice can be used to estimate the useful signal component.

Alternatively, an adaptive filter a(n) can be used to estimate the binaural voice. Assuming that the outer microphone signal $x(n)=x_a(n)+x_v(n)$ is composed of ambient noise $x_a(n)$ and a voice component $x_v(n)$, which is coherent to the estimate $\hat{v}(n)$ of the dry voice, an adaptive filter can be used to reproduce the voice component $x_v(n)$ in x(n) based on $\hat{v}(n)$. $\widehat{x_v}$ With the output $\widehat{x_v}(n)$ of the adaptive filter, a prescription for adapting the adaptive filter can be found based on the following cost function:

$$C_v=E\{(x(n)-\widehat{x_v}(n))\wedge 2\},\ \text{with}\ \widehat{x_v}(n)=a(n)*\hat{v}(n).$$

Furthermore, the estimation unit 31 can analyze the acoustic influence of the room on one's own voice and based thereon select or design a filter which can be applied to the estimated dry voice signal in order to generate a voice signal which has a comparable spatiality to the voice component at the outer microphones.

The forward filter W(z) can be obtained, for example, by solving the Wiener-Hopf equation $$w=\Psi_{s's'}^{-1}\varphi_{s'}(p-h)$$

This requires one or more measurements of the primary path P(z) and the secondary path S(z). These measurements can be carried out, for example, on an artificial head or on test persons. It is important here that any delay caused by the processing in the branch between the respective outer microphone and the headphone loudspeaker is taken into account by the secondary path used for the calculation of the forward filter. If, for example, the signal x(n) or any signals derived from it, which are subsequently played back via the loudspeaker, are delayed when the binaural voice is estimated, this delay by the secondary path must be taken into account. This is indicated by an apostrophe in the Wiener-Hopf equation above.

The desired transmission behavior from the outer to the inner microphone, which is usually characterized by a flat magnitude response for the natural perception of one's own voice, is described by H(z) in the z-range or by the impulse response h(n) and is also required for the Wiener-Hopf equation.

Figure 4:
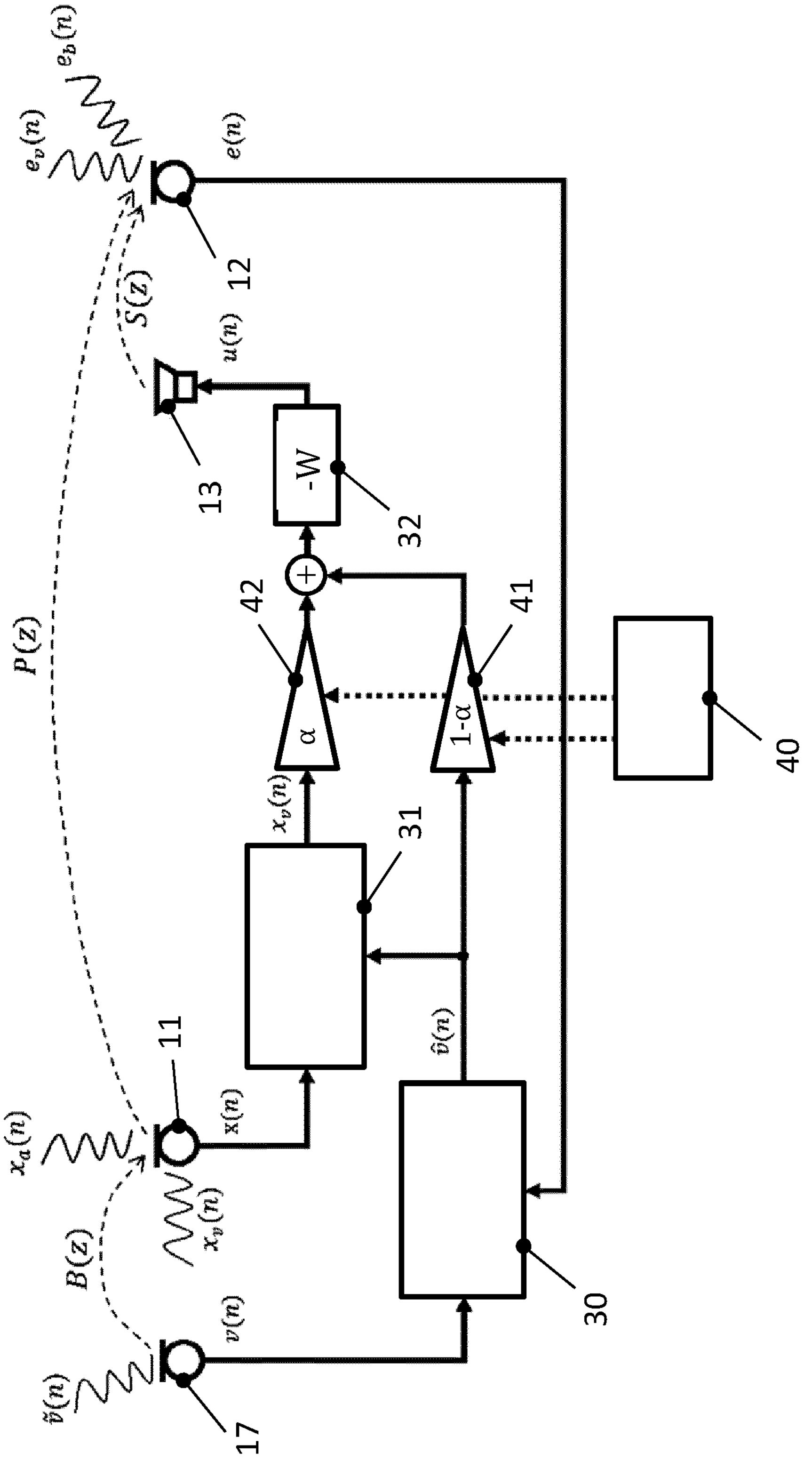
FIG. 4 shows a block diagram of a second embodiment of a disclosed headphone.

FIG. 4 shows a block diagram of a further disclosed device. In addition to the units of the device from FIG. 3, a control unit 40 for controlling two weighting units 41 and 42 is also provided here. Since in the case shown $\hat{v}(n)$ and $x_v(n)$ are coherent, i.e., are not or at least not noticeably shifted from one another in the time domain, both signals can be weighted with linear weighting factors $\alpha$ and $1-\alpha$, with $0\leq\alpha\leq 1$ and then added. The weighting units 41 and 42 hereby enable the user to personalize the mix of dry and binaural voice. The user can thus decide and adjust for himself how he perceives his voice, for example in what ratio the volume of the reverberation should be to the volume of his own voice. However, the control can also take place automatically.

As described above, one consequence of the occlusion effect is that the low-frequency components of one's own voice are amplified. To compensate for this, the inner microphone signal can additionally be filtered with a feedback controller in such a way that the low frequency components of one's own voice are reduced. In this way, the perception of one's own voice appears even more natural when wearing headphones.

In this case, the estimation units 30 and 31 and the control unit 40 can be part of a processor unit which has one or more digital signal processors but can also contain other types of processors or combinations thereof. Furthermore, the filter coefficients of the digital filter 32 can be adjusted by the digital signal processor. The filter can be implemented as a time-invariant filter that is calculated once, uploaded to the headphone firmware and used in this form without any changes being made at runtime. An adaptive filter, which changes at runtime and adapts to the current circumstances, can also be used.

The disclosed device is preferably completely integrated in a headphone since the latency is very low due to the transmission of one's own voice through the structure-borne noise. In this case, the mouth microphone can also be part of the headphones, for example in a so-called communication headset attached to a bracket to be attached in front of the mouth or integrated in a head shell as a microphone array with directional characteristics. Likewise, a separate microphone can also serve as a mouth microphone. In principle, parts of the device can also be part of an external device, such as a smartphone.

Figure 5:
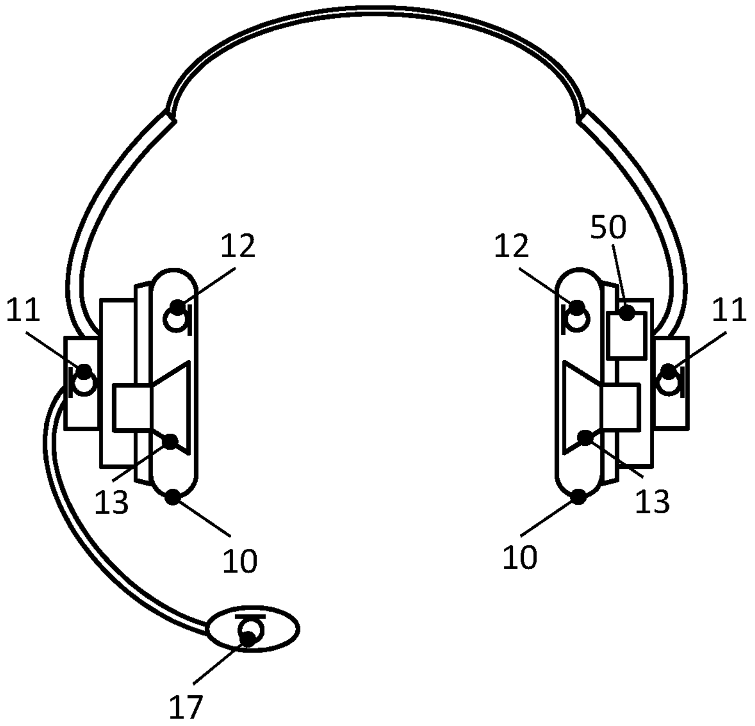
FIG. 5 schematically shows a communication headset for carrying out the disclosed method.

FIG. 5 shows schematically the use of a communication headset in which the disclosed method can be carried out and which has the device described above for this purpose. A headset 10 is provided for each of the two ears of the user, in each of which an outer microphone 11, an inner microphone 12 and a loudspeaker 13 are integrated. Furthermore, a mouth microphone 17 is provided, which is attached to a swivel bracket. Furthermore, a processor unit 50 is arranged in one of the two headphones, by which the estimation units and possibly the control unit 40 are implemented. The individual components are connected to the processor unit 50, but this is not shown in the figure to improve clarity.

The disclosed embodiments can be used to suppress the occlusion effect when reproducing audio signals with any headphones or hearing aids, such as telephony or communication with communication headsets/hearables, so-called in-ear monitoring for checking one's own voice during a live performance, augmented/virtual reality applications or use with hearing aids.

REFERENCE LIST

10 Single Headphone, Single Hearing Aid
11 Outer microphone
12 Inner Microphone
13 Loudspeakers
14 Ear insert
15 Ear canal,
16 Eardrum
17 Mouth microphone
20-24 Process steps
30 First estimation unit
31 Second estimation unit
32 Digital eardrum filter
40 Control unit
41, 42 Weight unit
50 Processor unit

The invention claimed is:

1. A method for actively suppressing the occlusion effect during the playback of audio signals by means of headphones or a hearing aid, comprising:

capturing with at least one outer microphone of the headphones or the hearing aid, external sound in the form of a sound signal occurring from the outside;

capturing a voice signal with at least one additional microphone or microphone array directed towards the mouth of the user and/or an inner microphone of the headphones or hearing aid;

estimating the dry component of the captured voice signal, wherein the dry component of the captured voice signal is the component of the captured voice signal without reverberation caused by the surrounding space and without ambient noises, wherein a monaural dry component is estimated from the captured voice signal and based thereon binaural voice signals are extracted from the signals of at least two outer microphones of left and right headphones or left and right hearing aids, or the estimated monaural dry voice component is filtered to generate binaural voice signals with a comparable spatiality to the voice component at the outer microphones;

extracting a voice component by a filter from the external sound captured with the at least one outer microphone, with filter coefficients of the filter being determined based on the estimated dry component of the captured voice signal, or the estimated dry component of the captured voice signal is filtered such that a voice component is produced which has a comparable spatiality to the voice component at the at least one outer microphone; and outputting the extracted or generated voice component via a loudspeaker of the headphones or hearing aid.

2. The method according to claim 1, wherein the binaural voice signals are filtered for left and right headphones or left and right hearing aids prior to being respectively output via a loudspeaker.

3. The method according to claim 1, wherein the estimate of the dry voice component at the outer microphone is performed by filtering with a respective relative impulse response between the mouth microphone or microphone array and the outer microphone and subsequent averaging.

4. The method according to claim 1, wherein the filter for extracting or generating the voice component based on the detected outside noise and the estimated dry voice is a Wiener filter, an adaptive filter or a filter which simulates a room impulse response.

5. Device for actively suppressing the occlusion effect during the playback of audio signals by means of a loudspeaker in a headphone or hearing aid provided with at least one outer microphone, comprising:

at least one additional microphone or microphone array directed towards the mouth of the user and/or an inner microphone of the headphones or hearing aid for capturing a voice signal from a user, a digital signal processor which is arranged to estimate a dry component of a voice signal captured with the at least one additional microphone, wherein the dry component of the captured voice signal is the component of the captured voice signal without reverberation caused by the surrounding space and without ambient noises, wherein a monaural dry component is estimated from the captured voice signal and based thereon binaural voice signals are extracted from the signals of at least two outer microphones of left and right headphones or left and right hearing aids, or the estimated monaural dry voice component is filtered to generate binaural voice signals with a comparable spatiality to the voice component at the outer microphones;

extract from the external sound captured by the at least one outer microphone the voice component using a filter, wherein filter coefficients of the filter are determined based on the estimated dry component of the captured voice signal, or filters the estimated dry component of the captured voice signal to produce a voice component which has comparable spatiality to the voice component at the outer microphones; and outputting the extracted or generated voice component via the loudspeaker.

6. The device according to claim 5, further comprising a digital filter to which the extracted or generated voice component is supplied before it is output via the loudspeaker.

7. Headphones adapted to perform a method according to claim 1.

8. A method for actively suppressing the occlusion effect during the playback of audio signals by means of headphones or a hearing aid, comprising:

capturing with at least one outer microphone of the headphones or the hearing aid, external sound in the form of a sound signal occurring from the outside;

capturing a voice signal with at least one additional microphone;

estimating the dry component of the captured voice signal, wherein the dry component of the captured voice signal is the component of the captured voice signal without reverberation caused by the surrounding space and without ambient noises;

extracting a voice component by a filter from the external sound captured with the at least one outer microphone, with filter coefficients of the filter being determined based on the estimated dry component of the captured voice signal, or the estimated dry component of the captured voice signal is filtered such that a voice component is produced which has a comparable spatiality to the voice component at the at least one outer microphone, linearly weighting and adding the estimated dry component of the detected voice signal and the extracted or generated voice component; and outputting the linearly weighted and added components via a loudspeaker of the headphones or hearing aid.

9. Headphones adapted to perform a method according to claim 8.

* * * * *